(12) United States Patent
Yalin et al.

(10) Patent No.: US 8,740,432 B2
(45) Date of Patent: Jun. 3, 2014

(54) TRANSMISSION OF LASER PULSES WITH HIGH OUTPUT BEAM QUALITY USING STEP-INDEX FIBERS HAVING LARGE CLADDING

(75) Inventors: Azer P. Yalin, Fort Collins, CO (US); Sachin Joshi, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 511 days.

(21) Appl. No.: 13/218,263

(22) Filed: Aug. 25, 2011

(65) Prior Publication Data

US 2012/0051084 A1    Mar. 1, 2012

Related U.S. Application Data

(60) Provisional application No. 61/376,880, filed on Aug. 25, 2010.

(51) Int. Cl.
*G02B 6/028* (2006.01)

(52) U.S. Cl.
CPC ............... *G02B 6/005* (2013.01); *G02B 6/028* (2013.01)
USPC ............................. 362/553; 362/556; 362/259

(58) Field of Classification Search
CPC .......................... G02B 6/0005; G02B 6/02038
USPC ........... 362/553, 556, 511, 259; 385/124, 123
See application file for complete search history.

(56) References Cited

U.S. PATENT DOCUMENTS 4,410,235 A * 10/1983 Klement et al. .................. 385/4

OTHER PUBLICATIONS

Joshi, Sachin et al., "Delivery of Nanosecond Nd:YAG Laser Pulses to Form Sparks in Gases with Step-Index Silica Fibers," Laser Plasma Diagnostics Laboratory, Dept. of Mechanical Engineering, Colorado State University, Fort Collins, Colorado-80524, pp. 1-4.
Hurand, Simon et al., "Mode Coupling and Output Beam Quality of 100-400 um Core Silica Fibers," Applied Optics, vol. 50, No. 4 , Feb. 1, 2011, pp. 492-499.

(Continued)

*Primary Examiner* — Sharon Payne
(74) *Attorney, Agent, or Firm* — Samuel M. Freund; Cochran Freund & Young LLC

(57) ABSTRACT

An apparatus and method for transmission of laser pulses with high output beam quality using large core step-index silica optical fibers having thick cladding, are described. The thick cladding suppresses diffusion of modal power to higher order modes at the core-cladding interface, thereby enabling higher beam quality, $M^2$, than are observed for large core, thin cladding optical fibers. For a given NA and core size, the thicker the cladding, the better the output beam quality. Mode coupling coefficients, D, has been found to scale approximately as the inverse square of the cladding dimension and the inverse square root of the wavelength. Output from a 2 m long silica optical fiber having a 100 μm core and a 660 μm cladding was found to be close to single mode, with an $M^2=1.6$. Another thick cladding fiber (400 μm core and 720 μm clad) was used to transmit 1064 nm pulses of nanosecond duration with high beam quality to form gas sparks at the focused output (focused intensity of >100 GW/cm²), wherein the energy in the core was <6 mJ, and the duration of the laser pulses was about 6 ns. Extending the pulse duration provided the ability to increase the delivered pulse energy (>20 mJ delivered for 50 ns pulses) without damaging the silica fiber.

40 Claims, 7 Drawing Sheets

(56) References Cited

OTHER PUBLICATIONS

Fermann, Martin E., "Single-Mode Excitation of Multimode Fibers with Ultrashort Pulses," Optics Letters, vol. 23, No. 1, Jan. 1, 1998, pp. 52-54.

Stacey, C.D. et al., "Demonstration of Fundamental Mode Only Propagation in Highly Multimode Fibre for High Power EDFAs," arXiv:physics/0607198v1, Physics.optics, Jul. 23, 2006, Pages.

Tauer, Johannes et al., "Transportation of Megawatt Millijoule Laser Pulses Via Optical Fibers?" Cent. Eur. J. Phys, 8(2), 2010 pp. 242-248.

Kuhn, Andreas et al., "Preparation of Fiber Optics for the Delivery of High-Energy High-Beam-Quality Nd: YAG Laser Pulses," Applied Optics, vol. 39, No. 33, Nov. 20, 2000, pp. 6136-6143.

Savovic, Svetislav et al., "Equilibrium Mode Distribution and Steady-State Distribution in 100-400 um Core Step-Index Silica Optical Fibers," Applied Optics, vol. 50, No. 21, Jul. 20, 2011, pp. 4170-4173.

Tauer, Johannes et al., "Laser-Initiated Ignition," Laser & Photon. Rev. 4, No. 1, 99-122, 2010, pp. 99-122.

Mullett J D et al., "A Comparative Study of Optical Fibre Types for Application in a Laser-Induced Ignition System," J. Opt. A: Pure Appl., Opt. 11, 2009, pp. 1-10.

El-Rabii, H. et al., "Laser Ignition of Flammable Mixtures Via a Solid Core Optical Fiber," Appl. Phys. B 87, pp. 139-144, 2007.

\* cited by examiner

TRANSMISSION OF LASER PULSES WITH HIGH OUTPUT BEAM QUALITY USING STEP-INDEX FIBERS HAVING LARGE CLADDING

STATEMENT REGARDING FEDERAL RIGHTS

This invention was made with government support under Contract No. DE-FC26-01CH11079 awarded by the U.S. Department of Energy. The government has certain rights in the invention.

CROSS-REFERENCE TO RELATED APPLICATIONS

The present application claims the benefit of U.S. Provisional Patent Application No. 61/376,880 for "Advanced Single-Mode Fibers" which was filed on Aug. 25, 2010, the entire contents of which is hereby specifically incorporated by reference herein for all that it discloses and teaches.

FIELD OF THE INVENTION

The present invention relates generally to an apparatus and method for transmitting laser pulses using optical fibers and, more particularly, to the transmission of laser pulses with high output beam quality using step-index fibers having large cladding.

BACKGROUND OF THE INVENTION

There are a number of applications for which it is desired to use fibers to deliver high power laser pulses having high output beam quality, for example, laser ignition of engines. An embodiment of such a system uses a single laser source located in the vicinity of the engine to deliver the light pulses to the combustion volumes, for example, an engine cylinder. Typical laser sources might be diode-pumped Q-switched Nd:YAG lasers. However, in typical applications where there are multiple ignition sites, for example, 6-20 engine cylinders, a distributed approach with a single laser and fiber optic delivery is preferred. Fiber delivery (using a single laser) increases safety, allows the laser to be located away from the high temperature conditions near the cylinder and, especially for multi-cylinder engines, should enable lower cost multi-plexed solutions when compared to mounting a laser on each cylinder. Thus, the fiber delivery approach can potentially provide implementations that are simpler, less expensive, safer, and more reliable in the vibrating and hot engine environment; however fiber delivery has been difficult.

Although tight focusing of the fiber output beam is required for spark formation, the use of conventional single-mode (SM) fibers having small core size is problematic for several reasons: the maximum power that such cores can carry is generally insufficient, the tolerance for misalignment at the launch becomes exceedingly difficult to maintain in practical systems, and diffraction and lens aberration may limit focused spot sizes (to several microns) making it difficult to sufficiently de-magnify the fiber output. Although silica (breakdown) damage limits for 1064 nm nanosecond pulses in bulk silica can be as high as 475 GW/cm², safe operating limits in multimode fibers are generally much lower, for example, $I_{BD,Si} \cong 1-5$ GW/cm², where $I_{BD,Si}$ is the intensity for breakdown in silica. Because of the large disparity in the breakdown level of air (It is to be noted that combusting gases are primarily air) relative to the fiber material, that is, $I_{BD,Air}/I_{BD,Si} \cong 100\text{-}300$, spark formation in air (without damage to the fiber) requires the light exiting the fiber be imaged at the spark location with linear demagnification of $\gtrsim 10\text{-}20$, which has been very difficult to obtain. More generally, even neglecting challenges of energy delivery, the use of small core single-mode fibers (core ~5-10 μm) is limiting because diffraction and aberration prevent focusing the output to needed spot-sizes of $\lesssim 1$ μm, while for typical large core fibers the multi-mode (high $M^2$) output precludes the needed demagnification.

Similar considerations apply for laser-induced breakdown spectroscopy (LIBS), laser drilling, cutting, and welding applications, as well as for surgical applications in medicine, all of which can benefit from fiber delivery of high power light pulses with high spatial beam quality (low $M^2$). In contrast to telecommunications, such applications typically require pulse delivery over relatively short distances (between about 1 m and approximately 20 m).

Hollow core fibers can be used to deliver high power pulses to form sparks in air; however, their versatility is limited by bending-induced degradation of modal quality.

SUMMARY OF THE INVENTION

Embodiments of the present invention overcome the disadvantages and limitations of the prior art by providing an apparatus and method for transmission of a beam of laser pulses through a large core, step-index optical fiber having improved spatial quality at the output.

Another object of embodiments of the invention is to provide an apparatus and method for transmission of a beam of laser pulses through a large core, step-index optical fiber having improved spatial quality at the output such that the pulses exiting the optical fiber are capable of sufficient demagnification effective for spark formation and ignition in the gas phase.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for transmission of a beam of laser pulses having a chosen energy, wavelength, $\lambda$, and duration, hereof, includes: an optical fiber having an input end, an output end, a selected length, a core having a chosen diameter, and a cladding having a diameter $>1.25\cdot$core diameter, and an output beam quality, $M^2 <$ core diameter (μm) $\cdot 1064/(20\cdot\lambda(\text{nm}))$; a first lens for receiving the beam of laser pulses and launching the beam of laser pulses into the input end of said optical fiber at a launch angle $\leq 0.03$ rad; and a second lens for focusing the beam of laser pulses exiting the output end of said optical fiber.

In another aspect of the present invention and in accordance with its objects and purposes, the apparatus for generating a gas-phase spark at pressures less than 100 atm, hereof, includes: a laser for producing a beam of laser pulses having a chosen energy, wavelength, $\lambda$, and duration; an optical fiber having an input end, an output end, a selected length, a core having a chosen diameter, and a cladding having a diameter $>1.25\cdot$core diameter, and an output beam quality, $M^2 <$ core diameter (μm) $\cdot 1064/(20\cdot\lambda(\text{nm}))$; a first lens for receiving the beam of laser pulses from the laser and launching the beam of laser pulses into the input end of the optical fiber at a launch angle ≤0.03 rad; and a second lens for focusing the collimated beam of laser pulses exiting the output end of the optical fiber.

In yet another aspect of the present invention and in accordance with its objects and purposes, the method for transmitting a beam of laser pulses having a chosen energy, wavelength, $\lambda$, and duration, T, hereof, includes the steps of: receiving the beam of laser pulses; focusing the beam of laser pulses into the input end of a step-index optical fiber having low mode-coupling at a launch angle ≤0.03 rad, the optical fiber having an input end, an output end, a selected length, a core having a chosen diameter, a cladding having a diameter >1.25·core diameter, and an output beam quality, $M^2$<core diameter $(\mu m)\cdot 1064/(20\cdot\lambda(nm))$, and wherein the core of the optical fiber is sufficiently large that the intensity of the beam of laser pulses in the core of the optical fiber is <5 $(10/T (ns))^{0.5}$ GW/cm$^2$; and focusing the beam of laser pulses exiting the output end of the step-index optical fiber.

In still another aspect of the present invention and in accordance with its objects and purposes, the method for generating a gas spark at pressures less than 100 atm, hereof, includes: producing a beam of laser pulses having a chosen energy, wavelength, $\lambda$, and duration, T; focusing the beam of laser pulses into the input end of a step-index optical fiber having low mode-coupling at a launch angle ≤0.03 rad, the optical fiber having an input end, an output end, a selected length, a core having a chosen diameter, a cladding having a diameter >1.25·core diameter, and an output beam quality, $M^2$<core diameter $(\mu m)\cdot 1064/(20\cdot\lambda(nm))$, and wherein the core of the optical fiber is sufficiently large that the intensity of the beam of laser pulses in the core of the optical fiber is <5 $(10/T (ns))^{0.5}$ GW/cm$^2$, at a launch angle ≤0.03 rad; and focusing beam of laser pulses exiting the output end of the step-index optical fiber.

Benefits and advantages of embodiments of the present invention include, but are not limited to, providing a noninvasive apparatus and method for transmitting a beam of laser pulses through a large-core step-index optical fiber, wherein the mode coupling is sufficiently decreased that the beam of laser pulses exiting the optical fiber can be tightly focused for applications involving laser ignition, laser-induced breakdown, laser machining, welding, cutting, and drilling, and ablation of biological materials.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
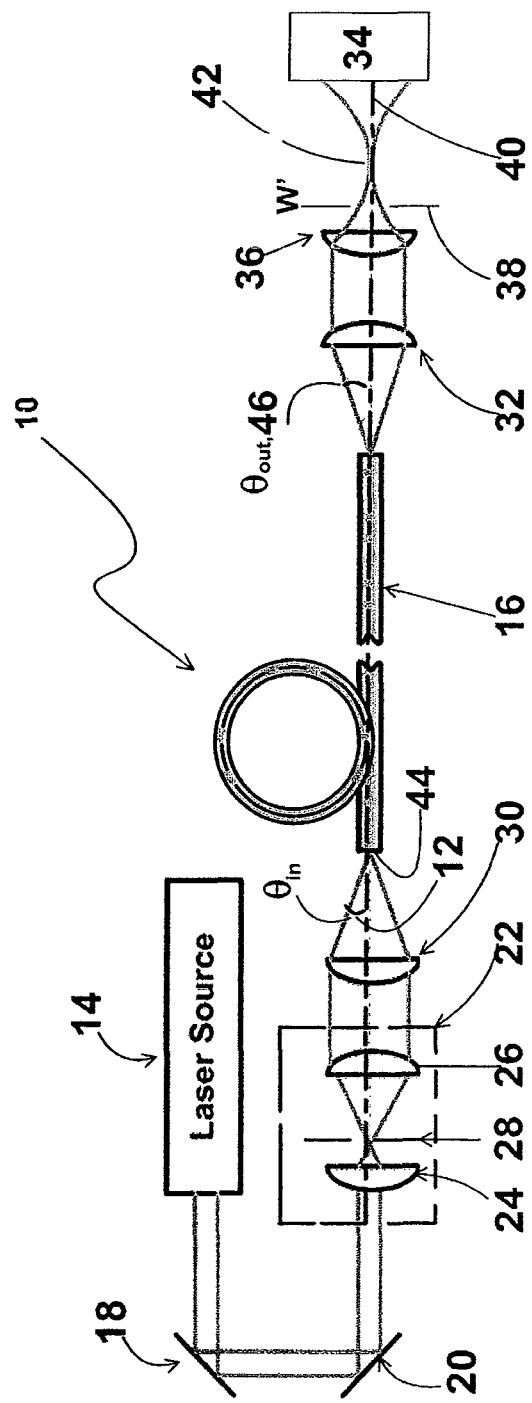
FIG. 1 is a schematic representation of an embodiment of the apparatus of the present invention, illustrating: a source of laser pulses; alignment and delivery mirrors; a telescope having an aperture; a launch lens; the optical fiber; a collimating lens; a focusing lens; and an object for receiving the focused radiation.

Briefly, embodiments of the present invention include an apparatus and method for high beam quality transmission of laser pulses using large core, thick cladding (cladding having a diameter >1.25·core diameter), step-index silica optical fibers. The thick cladding suppresses diffusion of modal power to higher order modes at the core-clad interface, thereby enabling higher output beam quality, characterized by $M^2$ than are observed for large core optical fibers having thin cladding. The best $M^2$=1 which corresponds to a TEM$_{00}$ beam, and low values of $M^2$ correspond to beams with higher (better) spatial beam quality. The focused spot size that can be obtained from a given lens starting with a collimated beam of a given diameter is proportional to the $M^2$ of the beam, so that the focused intensity scales as the inverse of the square of $M^2$. For high focused intensity applications such as laser spark formation for ignition or machining, low $M^2$ is important. In some situations, such as laser ignition, a definite threshold intensity is required; that is, there is a sharp cutoff between usable and non-usable $M^2$ values, while in other situations, such as some machining processes, process performance improves with high focused intensity (low $M^2$), but in a more continuous manner. To quantify the required performance of the large clad fibers, for the applications to be described hereinbelow, an $M^2$<core diameter $(\mu m)\cdot 1064/(20\cdot\lambda(nm))$, where $\lambda$ is the wavelength of the laser pulses, provides adequate demagnification (focusing) of the output laser beam. It is to be understood that that in different applications, the achievable and the required $M^2$ values may change, but use of the larger cladding fibers in accordance with the teachings of the present invention, will generally significantly improve the $M^2$ (and application) relative to the use of conventional fibers.

Propagation and mode coupling coefficients within relatively short (~1-20 m) large core, nominally multi-mode, fibers are of interest in a number of applications. Investigation of output beam quality and mode-coupling for fibers having core diameters between 100 µm and 400 µm, lengths of about 2 m, and different cladding dimensions, numerical apertures, and wavelengths, shows that for a given NA and core size, the thicker the cladding, the better the output beam quality, $M^2$. Mode coupling coefficients, D, have been determined based on modal power diffusion considerations, and show that D scales approximately as the inverse square of the cladding dimension, and approximately as the inverse square root of the wavelength. For a constant divergence of angular output, $M^2$ is approximately linearly proportional to the core size. Output from a 2 m length fiber of 100 μm core and 660 μm cladding fiber is close to single mode ($M^2=1.6$), while output from a 200 μm core and 745 μm cladding fiber also has high beam quality.

Mode coupling and output beam quality for step-index silica fibers having relatively large cores (100 to 400 μm), and lengths less than about 10 m have been parametrically investigated by Simon Hurand et al. in "Mode Coupling and Output Beam Quality Of 100-400 μm Core Silica Fibers," Applied Optics 50, No. 4, pages 492-499 (2011), the disclosure and teachings of which are hereby incorporated by reference herein. Dependences on core size, cladding size, wavelength, and fiber bending were examined to determined fibers and fiber operating conditions that permit excitation of only a small number of modes.

The spatial beam quality ($M^2$) at the output of a fiber depends on the distribution of modes propagating within the optical fiber. The number of modes that a fiber can support is governed by the fiber V parameter (dimensionless frequency), $V=(2\pi/\lambda)aNA$, where $\lambda$ is the wavelength of light, a is the core radius, and NA is the numerical aperture. A step-index fiber with V<2.405 is SM (that is, it supports only a single-mode, $LP_{01}$), while fibers with larger V values support increasingly larger numbers of modes ($\sim V^2/2$). Typical commercial SM fibers have numerical aperture of 0.22 (or comparable) and, as mentioned above, core sizes between about 5 μm and approximately 10 μm. Larger core fibers having comparable NA values quickly become multi-mode (MM). (In principle, low values of V can be maintained with increased core size by reducing the NA but practicality of such approaches is limited by increased bending losses.) It is important that the V parameter governs the modes that the fiber can support, but not all allowed modes actually propagate within a given fiber. The intensity profile of light on the fiber input face determines the initial (upstream) distribution of modes. The light in these modes then couples to other modes as it propagates along the length of the fiber. The coupling can be described with mode coupling coefficients, $D_m$ ($rad^2/m$), that give the strength of coupling between modes m and m+1 (where m is a compound mode number). Mode coupling is attributed largely to curvature (imperfections) at the core/cladding interface, also termed micro-bending, and the coupling coefficients can be expressed in terms of the power spectrum of the curvature. The strength of coupling between a pair of modes depends on the value of the power spectrum at the spatial frequency equal to the corresponding beat wavelength. The mode coupling process can be viewed as a power diffusion problem.

Configurations in which a single mode (or small number of modes) is excited at the launch of a fiber that has low mode coupling will tend to support a relatively small number of modes along the fiber length, especially for short fiber lengths. The fiber length needed to achieve a "steady-state" modal distribution, that is, a distribution in which the fractional power in each mode no longer changes with position, varies with fiber parameters, and is larger for situations where the mode coupling is weak. For the large cladding fibers of the present invention, the length necessary to achieve a steady-state modal distribution may vary from hundreds of meters to several kilometers. For this reason, fibers having lengths of hundreds of meters may still maintain high beam quality.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1, a schematic representation of an embodiment of apparatus, 10, hereof for high beam quality transmission of laser pulses through a step-index fiber for various applications requiring tight focusing such as laser ignition, laser-induced dielectric breakdown spectroscopy, laser machining and welding, and ablation of biological materials, as examples, and for measuring the beam quality and beam properties of light exiting the fibers. The beam quality at the output of a fiber depends on the fiber properties, but also may vary with the launch beam conditions including beam quality, input half-angle $\theta_{in}$, 12, and the position and angle of the input beam relative to the fiber axis. Laser, 14, used for measuring the parameters associated with step-index fiber, 16, was a 633 nm, 5 mW continuous-wave (CW) helium neon (He—Ne) laser having a high beam quality ($M^2=1.05$). All lenses used were positive plano-convex lenses but, clearly, there are many combinations of optical elements that may be utilized. Mirrors, 18, and, 20, were used for basic alignment. Telescope, 22, using lenses, 24, and, 26, is used to reduce or enlarge the size of the laser output beam, if necessary, and as a spatial filter as part of our launch. For this second function, the telescope has a pinhole (or similar aperture, such as a wire die), 28, at its focal location in order to reduce the modal content of the laser beam, and improve/lower $M^2$. For some lasers this is necessary for obtaining good beam quality at the fiber launch. If a spatial filter is used, it is generally part of the telescope, such that both structures are combined.

The beam exiting telescope 22 was directed into fiber 16 through focusing lens, 30. A 20-cm portion of the fiber at the input end was kept approximately straight by mounting it on a 20 cm aluminum platform (not shown in FIG. 1). The fiber input and platform were mounted on a 5-axis precision stage with three translational axes and two angular (rotation) axes. The fiber output may be collimated by lens, 32, located following fiber 16. Optimal fiber input alignment was found by minimizing the beam size (as determined from the second moment of the intensity distribution) following collimating lens 32. This alignment was obtained by careful tuning of the translational and angular positions of the 5-axis mount. Beam profiler, 34, was used to measure the output beam diameters in this situation by positioning the profiler downstream of lens 32 (without other optics between lens 32 and beam profiler 34). Also, conventional $M^2$ measurements of the fiber output were obtained using lens, 36, to refocus the beam and using beam profiler 34 to measure beam sizes w', 38, at various distances z along optical axis, 40. Transmission of all fibers studied was >90% (including input coupling and fiber attenuation). In use for applications, collimating lens may not be required, and the output of fiber 16 may be directly focused using lens 36. In many applications, a small focal spot, 42, is desired (high demagnification); therefore, strong focusing optics having minimal aberrations and low f numbers, are employed. Also, in actual use of apparatus 10, the object or work piece onto which the focused laser beam is intended to be incident would be placed along axis 40 at or near focus 42.

The properties of the incoming beam were varied by changing the focal lengths of lenses 24 and 26 in telescope 22, which generated different combinations of launch angle and waist sizes. The size of the launch with the fraction w/a, where w is the waist of the focused launch beam and a is the fiber core radius. For the high beam quality laser source and the low launch angles employed ($\theta_{in}$ 0.01 rad), the output beam quality is substantially unchanged for 0.2 w/a 0.8; for example, $M^2$ changes by less than ±15%. Input face, 44, of fiber 16 was positioned at the waist of the incoming beam to a precision of less than 1 mm which is smaller than Rayleigh range, $z_R$. It was also found that as long as the separation distance between the fiber input face and the beam waist location was less than $z_R$, the output beam quality was unchanged; however, as this separation distance was increased to greater than $z_R$, the output beam quality decreased. For example, the output $M^2$ increased by a factor of 1.5 at $2z_R$ for a 200 μm core with 745 μm clad. These results are interesting for delivering high peak power laser beam through fibers, where it can be advantageous to place the fiber input downstream of the waist as a means to lower the intensity on the fiber. Since external stress on the fiber influences the output beam quality, low-stress configurations were employed, such as the use of double-sided tape to hold the fibers instead of using connectorized fibers. Other low stress mounts, holding systems, and fiber paths are also possible.

The fiber output beam quality $M^2 = w_{out}\theta_{out}/(\lambda/\pi)$, where $w_{out}$ is the beam waist at the fiber output and $\theta_{out}$ (reference character 46 in FIG. 1) is the angular divergence of the beam exiting the fiber. As an approximation, $w_{out}$ is equal to the core radius a (or at least between 0.5a and a) as has been verified by experiments. Values for D, the coupling coefficient of a step index fiber, were also computed as described hereinabove without any assumptions on $w_{out}$. See Hurand et al., supra.

Fibers were 2 m long, commercial fibers, and have step-index profiles with pure silica cores (n=1.457 at λ=633 nm) in order to obtain high damage thresholds for the fibers, and fluorine-doped silica cladding to obtain lower index of refraction. Clearly, other fibers with different buffers and jackets may be employed. For example, silica fibers with the core doped with germanium dioxide to raise its index, and having pure silica cladding. Typically, for the large cladding fibers, rather than doping the full cladding, an inner ring within the cladding is doped. For example, in a 200 μm core fiber with 600 μm cladding, only the inner ~50 μm of the cladding has fluorine doping. For fiber measurements as a function of wavelength, including measurements at 403 and 1064 nm, the 633 nm He—Ne laser was replaced with either a 403 nm diode laser or a 1064 nm diode laser, both with high beam quality ($M^2$<1.3). The large cladding fibers of the present invention may have very low OH concentrations for delivery of near infrared laser beams or, they can have high OH concentration for delivery of ultraviolet beams. The large cladding fibers may also be manufactured/treated as to have solarization resistant properties for delivery of light from near UV (~400 nm) to deep UV (<200 nm).

The fiber ends were fine flat polished to 0.3 μm. In what follows, fibers are described based on their core and cladding diameters. For example, 200/745 refers to a fiber with 200 μm core and 745 μm cladding. Since these numbers refer to the corresponding outside diameters, the cladding wall thickness would then be (clad-core)/2. TABLE 1 gives the numeric fiber parameters, the measured $M^2$ of the output beam (optimized $M^2$ values), the measured angular divergence of the output beam $\theta_{out}$ (average $\theta_{out}$ values), and associated coupling coefficients. Uncertainty of the measured $M^2$ values is typically ±15% owing primarily to the optimization of the fiber position and possibly the amount of stress carried by the fiber.

TABLE 1

| Core Diameter (μm) | Cladding Diameter (μm) | External Diameter (μm) | NA | $M^2$ | $\theta_{out}$ (rad) | $D_{Sav}$ (rad$^2$/m) | $D_{Model}$ (rad$^2$/m) |
|---|---|---|---|---|---|---|---|
| 100 | 140 | 250 | 0.22 | 3.8 | $1.9 \times 10^{-2}$ | $9.9 \times 10^{-6}$ | $9.0 \times 10^{-6}$ |
| 100 | 660 | 1100 | 0.22 | 1.6 | $7.8 \times 10^{-3}$ | $4.9 \times 10^{-7}$ | ** |
| 200 | 220 | 245 | 0.22 | 7-14 * | $1.4 \times 10^{-2}$ | $5.8 \times 10^{-6}$ | $5.8 \times 10^{-6}$ |
| 200 | 330 | 700 | 0.22 | 11 | $2.1 \times 10^{-2}$ | $1.3 \times 10^{-5}$ | $1.4 \times 10^{-5}$ |
| 200 | 745 | 1500 | 0.22 | 2.8 | $8.5 \times 10^{-3}$ | $1.9 \times 10^{-6}$ | $1.8 \times 10^{-6}$ |
| 200 | 220 | 245 | 0.12 | 8-15 * | $1.6 \times 10^{-2}$ | $7.2 \times 10^{-6}$ | $7.3 \times 10^{-6}$ |
| 400 | 720 | 1100 | 0.22 | 7 | $1.5 \times 10^{-2}$ | $6.4 \times 10^{-6}$ | $6.4 \times 10^{-6}$ |

Notes:
* Optimization of these fibers was unstable with the lowest $M^2$ values ~14 (15), but as low as ~7 (8) observed.
** Because of the high output beam quality (very low number of modes), the model fails to converge for the 100/660 fiber.

In TABLE 1, the external diameter refers to buffer and jacket, $D_{Sav}$ and $D_{Model}$ are values of the mode coupling coefficients as determined from the Savovic formula and the mode coupling model method respectively (See Hurand et al., supra).

A. Dependence on Core Size:

Fibers with smaller cores tend to produce better output beam quality ($M^2$), as can be observed by comparing fibers having differing cores, but for which the other parameters are relatively uniform. For example, referring to TABLE 1, this may be observed by comparing fibers with different cores having NA=0.22 and relatively small cladding, for example, 100/140 has $M^2$=1.6, while 200/220 has $M^2$=3.8. A similar comparison may be made between the fibers with NA=0.22 and relatively "thick" cladding, for example, 100/660, 200/745, and 400/720. For a fully excited fiber, that is, for a fiber supporting all possible modes, this result is expected as the fiber V parameter scales linearly with core size (and the number of modes scales as ~$V^2$). Further, the angular separation between adjacent modes, $\theta = \lambda/4an$, where n is the index of refraction of the fiber, decreases with a.

For a fiber that does not support all possible modes, either because of insufficient length or the modal power transfer balance, mode coupling coefficients and beat wavelengths between adjacent low-order modes may be considered. For example, for a fiber at λ=633 nm with NA=0.22 and 100 μm core, the beat wavelength between lowest order modes is $\Lambda \approx 50$ mm ($\Lambda = 2\pi/(\beta_{01}-\beta_{11})$, where $\beta_{01}$ is the propagation constant of the $LP_{01}$ mode etc.), and scales as $a^2$ for low-order modes far from cut-off. Theory tentatively suggests that the mode coupling coefficient is proportional to the power spectrum of the curvature which in turn scales as ~$\Lambda^4$, leading to D~$a^8$. However, the observed dependence is significantly weaker, with small dependence on the core size. In fact, the present measurements show the mode-coupling coefficient to be relatively independent of core size (with other parameters fixed), with the result that the fiber output angular divergence is also relatively independent of core size such that the output beam quality $M^2$ scales approximately linearly with core size.

Figure 2A:
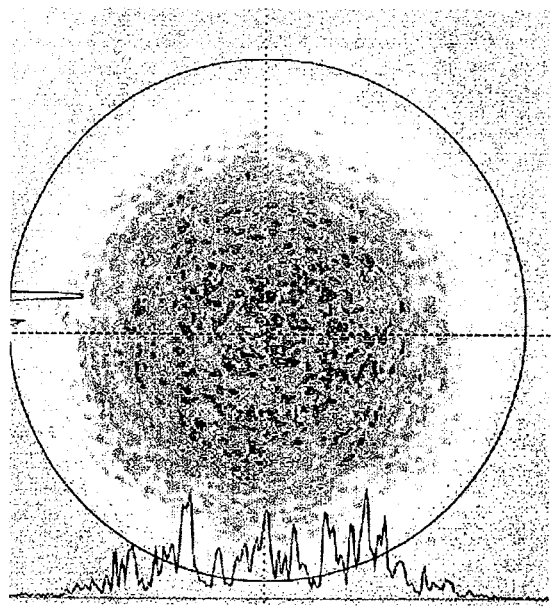
FIG. 2A is an image of the multi-mode output of a 200/220 µm fiber, illustrating the intensity profile with the circle showing the measurement region, using the apparatus described in FIG. 1 hereof.
Figure 2B:
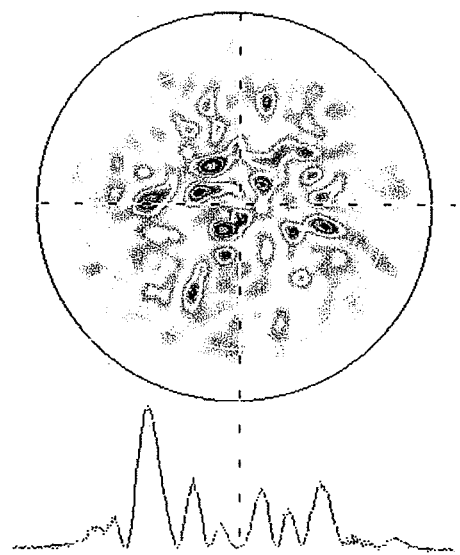
FIG. 2B is an image of a beam of intermediate beam quality from the output of a 200/330 µm fiber.

B. Dependence on Clad Size:

Lower mode coupling coefficients have been observed by others for large cladding fibers having 45 μm cores at a wavelength of 1.55 μm. As mentioned hereinabove, the influence of the large cladding is thought to be due to reduced micro-bending. The same trend may be observed for fibers having 100 and 200 μm cores: FIG. 2A shows an output beam profile for a 200 μm core fiber having a cladding diameter of 220 μm, while FIG. 2B shows an output beam profile for a 200 μm core fiber having a cladding diameter of 330 μm, and FIG. 3C shows an output beam profile for a 200 μm core having a cladding diameter of 745 μm. The profiles are measured after the collimating lens downstream of the fibers. Conditions are similar for the three situations, except that a larger launch angle was used for the 200/220 fiber in FIG. 2A. The fiber output $M^2$ values are 175, 11, and 2.8 for FIGS. 2A, 2B, and 2C, respectively. The multi-mode structure and significant speckle (resulting from interfering modes) visible for the smaller cladding fiber, and larger launch angle, of FIG. 2A is in strong contrast with light predominantly in a single peak for the larger cladding fiber of FIG. 2C. The fiber in FIG. 2B shows intermediate beam quality (and $M^2$). In comparison to FIG. 2A, more discrete peaks are visible, while in comparison to FIG. 2C, the profile is more multi-mode. Such a beam quality may be useful in some applications. The corresponding $M^2$ values in TABLE 1 show the same trend. The speckle pattern of the multimode beam is due to the high-temporal coherence of the CW He—Ne laser. Because FIGS. 2A, 2B, and 2C correspond to comparable amounts of total power, the actual peak intensity of the 200/745 profile is higher than that of the other two fibers, although this is not apparent in the images as different filtering was used in order to have the needed light levels on the camera utilized. It is to be noted that the standard cladding for commercial 200 μm fibers is in the range of 220-240 μm. It is also to be noted that in TABLE 1, the $M^2$ value for the 200/220 fiber is better (lower) than that of FIG. 2A, which is primarily due to differences in the launch angle. In order to achieve a high output beam quality (low $M^2$), an appropriate low-angle launch that preferentially excites a small number of modes at the launch is required, as well as large cladding to suppress mode-coupling along the length of the fiber. In accordance with embodiments of the present invention, cladding sizes may range between about 250 μm and about 4,000 μM for a 200 μm core fiber (such that cladding diameter >1.25·core diameter).

It is observed that for a given NA and core size, the thicker the cladding, the better the output beam quality ($M^2$=1 corresponds to a $TEM_{00}$ beam, and lower $M^2$ corresponds to better beam quality, as stated hereinabove). The comparison of the output $M^2$ for the 100/140 and 100/660 fibers (NA=0.22) shows this, and the 400/720 fiber (NA=0.22) has a better output beam quality than most of the 200 μm cores. The exception is that the 200/330 fiber in some cases showed slightly better beam quality than the 200/220 fiber though the latter was difficult to optimize. This inconsistency may be due to manufacturing variation, inadequate optimization, or fiber stress. As stated hereinabove, the observed dependence is $D \sim 1/b^2$, comparing 100/140 with 100/660 and 200/330 with 200/745, but shows a clear reduction in mode coupling coefficient with increased cladding diameter.

C. Dependence on Numerical Aperture:

Comparing the 200/220 fibers, the first one with NA=0.22 ($M^2$=7-14) and the second one with NA=0.12 ($M^2$=8-15), shows minimal effect of numerical aperture on output beam quality. While analysis suggests that mode coupling may vary with NA, simple considerations suggest it should not. For the short fiber lengths studied here ($L<L_{steady-state}$), only a relatively small number of modes are excited such that light propagates along the fiber with small angles $\theta<<\theta_C$, where $\theta_C$ is the critical angle for total internal reflection. In the phase space picture, the beat wavelength between low order modes does not change with NA (the propagation constants change, but not the corresponding beat wavelengths). See Hurand et al., supra.

D. Fiber Bending and Coiling:

Fibers bent with sufficiently tight curvatures exhibit macro-bending loss; however, bend radii in the applications stated hereinabove tend to be >~10 cm, for which macro-bending is negligible. Only small changes in beam quality have been observed at these larger radii. For the 200/745 fiber having 2-m length three conditions have been generated: (1) straight fiber orientation (the results are given in TABLE 1); (2) a single 90° bend in the fiber with a 20 cm radius of curvature; and (3) the fiber is coiled around a 10 cm drum (the full length is coiled except for short segments at input/output). The output beam qualities measured in these cases were output $M^2$=2.8, 3.8, and 3.3 respectively. A slight degradation of the beam quality with bending was observed, but the differences were small and comparable to the experimental uncertainty. In terms of determining fiber positioning and routing for practical configurations where high beam quality is needed, the need for low stress fiber positions and mounting schemes may be more important than fiber bending.

E. Dependence on wavelength:

The 200/745 fiber having 2 m length was studied for three different wavelengths (403, 633, 1064 nm) with results being shown in TABLE 2. Longer wavelengths are more confined within the core and therefore support fewer modes, thereby giving better output beam quality. The angular divergences of beams exiting the fiber were similar for the three wavelengths. The mode coupling coefficients varied as $\sim/\lambda^{-1/2}$.

TABLE 2

| λ (nm) | $M^2$ | $\theta_{out}$ | $D_{Model}$ ($rad^2$/m) |
| --- | --- | --- | --- |
| 403 | 3.8 | 9.1 × $10^{-3}$ | 2.4 × $10^{-6}$ |
| 633 | 2.8 | 8.5 × $10^{-3}$ | 1.8 × $10^{-6}$ |
| 1064 | 1.4 | 8.9 × $10^{-3}$ | 1.5 × $10^{-6}$ |

Thus, mode coupling has been considered in the context of modal power coupling, and the coefficients, D, were determined to scale approximately as the inverse square of the cladding dimension and approximately as the inverse square root of the wavelength. The dependence of D on core size has been observed to be minimal, and for a constant divergence of angular output (corresponding to constant D), $M^2$ is approximately linearly proportional to the core size. For practical fiber delivery systems, the decrease in beam quality with increasing core size suggests the use of small cores, but in certain high-power applications this may not be possible. For the relatively short fiber lengths, near single-mode output from 100 and 200 μm fibers has been achieved, which, with regular excitation and cladding, are generally far more multi-mode.

For high-power applications, non-linear effects such as Stimulated Brillouin Scattering (SBS) and self focusing need to be considered, but the results set forth in the EXAMPLE hereinbelow illustrate that large cladding fibers can be used to deliver high-power pulses that can be focused to produce sparks in gas having pressures <100 atm.

Figure 3:
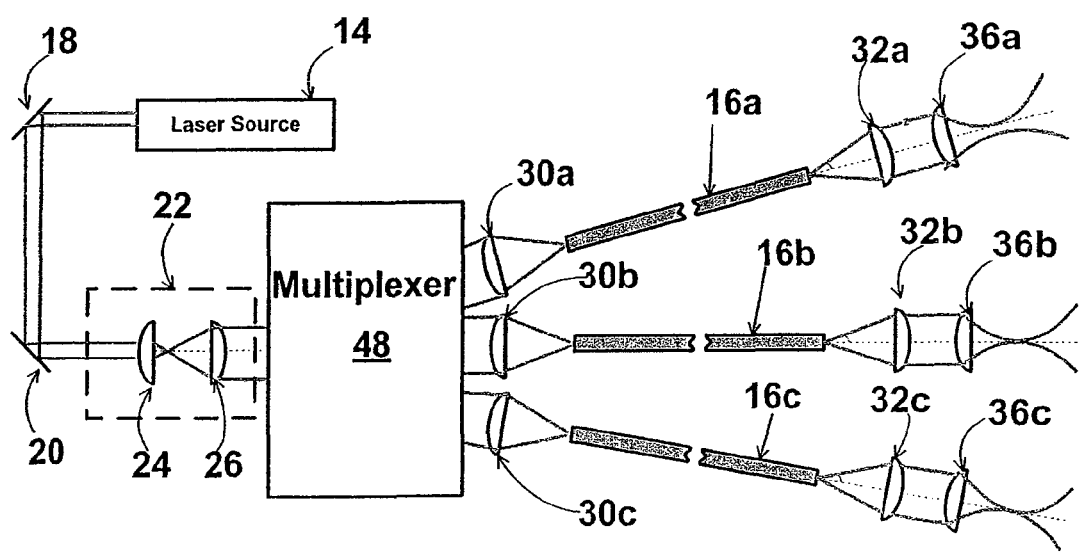
FIG. 3 is a schematic representation of another embodiment of the apparatus of the present invention, showing a single laser beam being multiplexed to several large clad fibers for applications where there is a need for multiple sources of focused light.

In applications where there are multiple ignition sites, a distributed approach with a single laser light source and fiber optic delivery is advantageous. That is, a single laser beam is multiplexed to many large cladding fibers, as shown in FIG. 3. The output from laser 14 is distributed to multiple fibers, illustrated as fibers 16a-16c by multiplexer, 48, which may include moving mirror(s) (or prism(s)) mounted on a rotating galvanometer (or other motor). The fibers may have individual launch lenses, shown as lenses 30a-30c, or a single launch lens for launching the beam into multiple fibers (not shown in FIG. 3), in which situation, the launch lens would be positioned in front of the moving mirror (or similar device) within multiplexer 48. Electro- or acousto-optic modulators, as examples, may also be used for multiplexing the laser beam.

Figure 4:
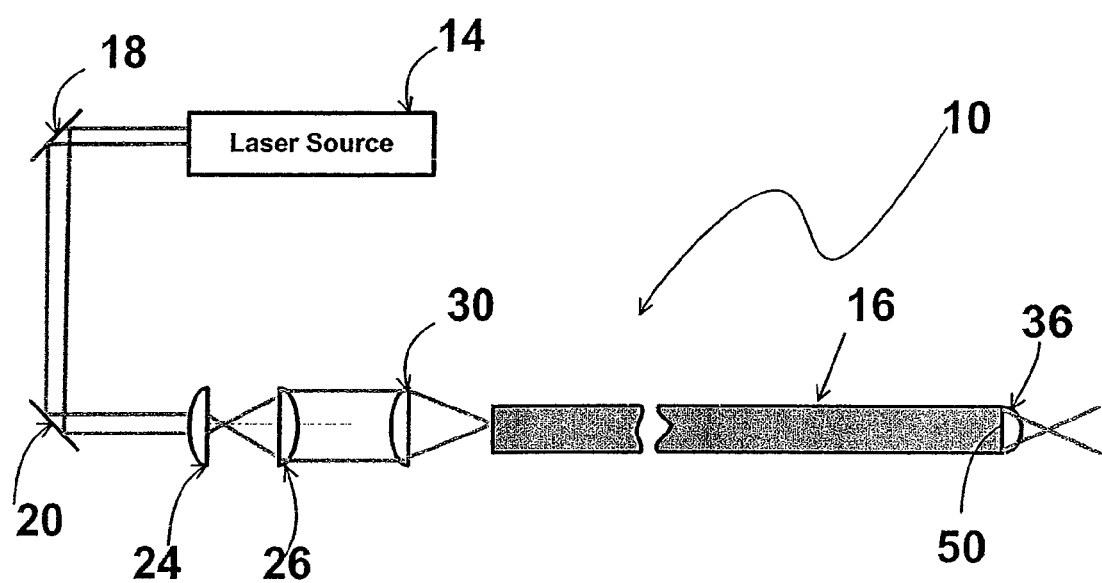
FIG. 4 is a schematic representation of another embodiment of the apparatus of the present invention, illustrating the focusing lens integrated into or directly attached to the output tip of a large clad fiber for ignition or medical applications, as examples.

For certain situations, for example, ignition or medical applications, focusing lens 36 may be integrated into or directly attached to output tip, 50, of large cladding fiber 16 as is shown in FIG. 4 hereof.

The fibers utilized in accordance with the teachings of the present invention may also be graded-index multimode fibers. In such fibers, the index of refraction across the core is varied gradually from a maximum at the center to a minimum near the edges. Because light travels faster in a low-index-of-refraction material than in a high-index material, light rays or modes of propagation that travel near the edges of the core travel faster for a longer distance, thereby transiting the fiber in approximately the same time as the "low-order modes", or rays traveling more slowly near the center of the core. Typically, graded index fibers have a silica core and silica cladding with dopants (generally, Ge, B, P, and F) used to adjust the refractive index in the graded profile. The physical mechanism for mode coupling in large core, step-index fibers is similar to that for large core graded-index fibers. Hence, large core, graded-index fibers having thick claddings are likely to yield output beams with improved spatial quality.

Having generally described embodiments of the present invention, the following EXAMPLE provides additional details.

EXAMPLE

1. Laser Ignition

Reliable fiber transmission of high peak-power (~MW) pulses having sufficient beam quality to permit refocusing to an intensity exceeding the breakdown threshold of the gas, that is, $I_{BD,Air} \cong 100\text{-}300$ GW/cm$^2$ for 10 ns, 1064 nm pulses at atmospheric pressure with pressure scaling of $\sim p^{-0.5}$ is a requirement for laser ignition. Typical fuel-air mixtures for stationary natural gas engines are lean with air volume fraction >90% so that the breakdown threshold for the mixture is comparable to that of pure air ($I_{BD,Air}$). Silica-based step-index fibers remain attractive owing to their low-cost and commercial maturity. Although silica (breakdown) damage limits for 1064 nm nanosecond pulses in bulk silica can be as high as 475 GW/cm$^2$, safe operating limits in multimode fibers are generally much lower, for example, $I_{BD,Si} \cong 1$ GW/cm$^2$. A practical working relationship is a beam intensity within the fiber core of $<5 (10/T (ns))^{0.5}$ GW/cm$^2$, where T is the duration of the pulse in units of nanoseconds. Durations, T, from femtoseconds to milliseconds are contemplated. Because of the large disparity in the breakdown level of the combusting gases relative to the fiber material, that is, $I_{BD,Air}/I_{BD,Si} \cong 100\text{-}300$, spark formation in the combustible gas (without damaging the fiber) requires that the light exiting the fiber should be imaged at the spark location with linear demagnification of 10-20.

Figure 2C:
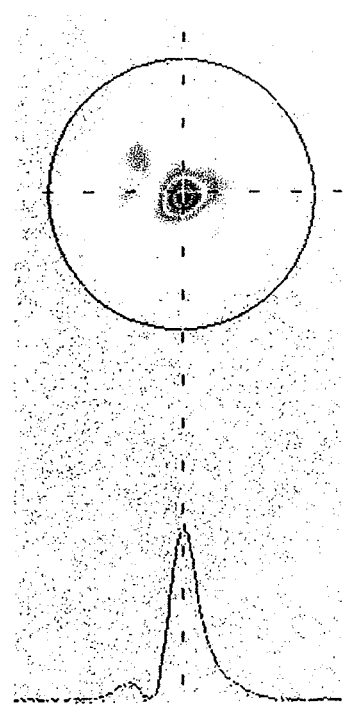
FIG. 2C is an image of the near single-mode output of a 200/745 µm optical fiber with the circle showing the measurement region, using the apparatus described in FIG. 1 hereof, the bottom portion of each of FIGS. 2A, 2B and 2C showing a graph of the intensity profile along the center of the beam, the notation 200/330 designating a fiber having a core diameter of 200 µm and a cladding diameter of 330 µm, wherein the cladding wall thickness is 65 µm (330-200)/2.
Figure 5:
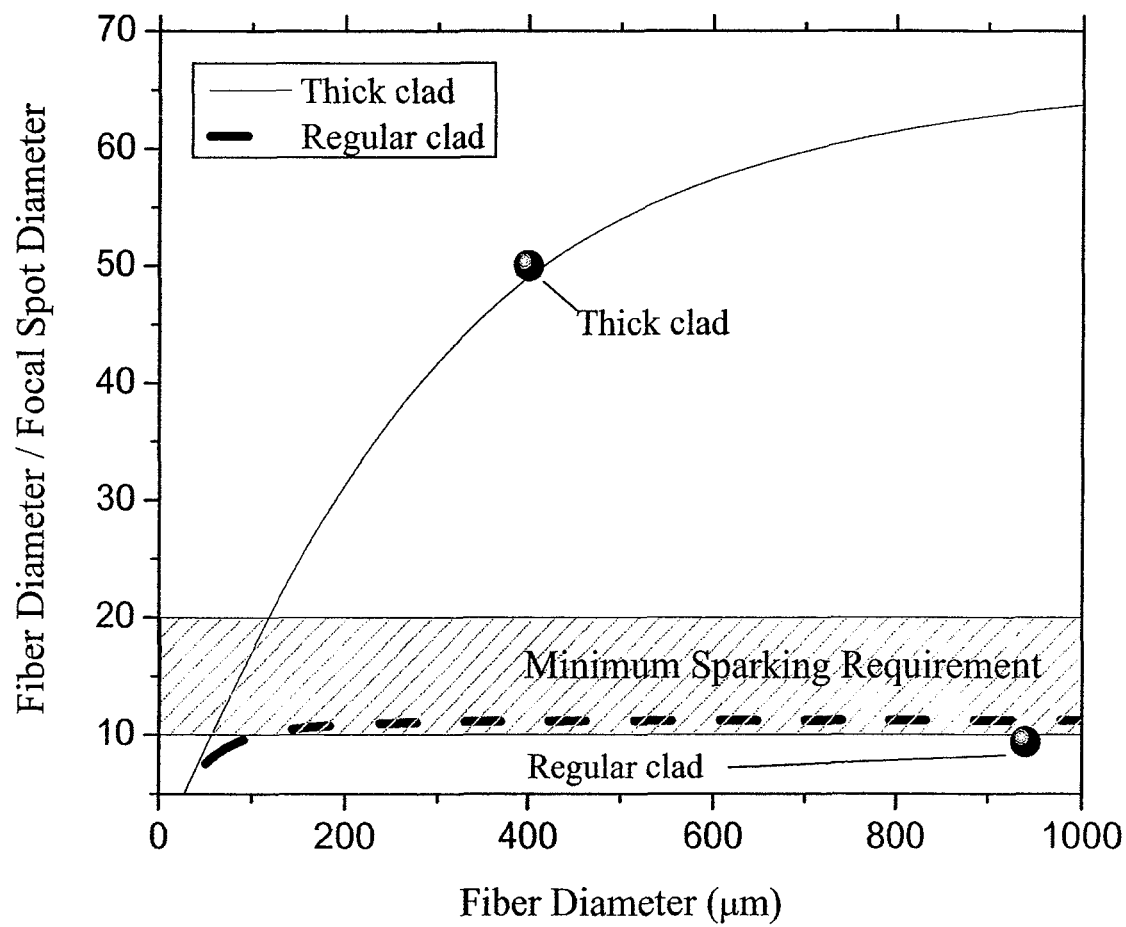
FIG. 5 is a graph illustrating calculated linear demagnifications (ratio of fiber diameter to focused spot size) achievable with thick cladding and regular fibers for 1064 nm excitation, where demagnification of ≳10-20 is required for spark formation of the fiber output in air.

As described hereinabove, delivery of 633 nm light through a 2 m length of silica fiber having 200 μm core and 745 μm cladding yielded an output beam with M$^2$=2.8, while a similar fiber with typical clad of 220 μm yielded output M$^2$=7-14, depending on alignment. Because, as described hereinabove, the focused intensity is proportional to the inverse of the square of M$^2$, the output from the thick cladding fiber can be focused at least ~4 times more tightly, thereby yielding an approximately 16-fold higher focused intensity. It is to be noted that as was discussed for FIG. 2A, the output beam quality also depends on the fiber launch angle, and that beam quality in the range M$^2$=7-14 may be useful for some applications. FIG. 5 is a graph illustrating calculated linear demagnifications achievable using thick cladding fibers and regular cladding fibers for 1064 nm excitation. These curves show demagnifications exceeding ~10-20, can be achieved using the thick cladding fibers, assuming a focusing lens with f#=2 and M$^2$ values from the discussion hereinabove for low laser powers. Beam profiles for the (unfocused) light exiting large and regular cladded fibers are also shown in FIGS. 2A, 2B, and 2C.

For fixed core size and numerical aperture (constant V parameter) the regular and large cladded fibers can support the same number of modes; however, the reduced M$^2$ at the output of the large cladding fibers is due to a smaller number of modes being excited and propagated along the fiber length. The diffusion of power between modes can be described with mode coupling coefficients, $D_m$ (rad$^2$/m), that give the strength of coupling between modes m and m+1 (where m is a compound mode number). Mode coupling is attributed largely to curvature (imperfections) at the core cladding interface, analogous to micro-bending, and the reduced mode coupling in the thick cladding fiber is attributed to improved uniformity at the core cladding interface. For large cladding fibers several meters long, the exit modal distributions are far from the steady state that would be achieved in long fibers. See, Hurand et al., supra.

Using the apparatus illustrated in FIG. 1 hereof with Q-switched Nd:YAG laser 14 having a beam quality M$^2$<2 and pulse duration of 9.5 ns, the launched beam was adjusted preferentially excite only a few low-order modes (primarily LP$_{01}$) at the fiber input 44 at 1064 nm. Light exiting fiber 16 was collimated with lens 32 and focused using lens 36 having f=10 mm. Focusing lens 36 was also used as the input window to a high pressure cell filled with nitrogen that allowed study of pressure dependences (Not shown in FIG. 1). Commercial fibers having 400 μm core and 720 μm cladding were tested. The core is pure silica, while the cladding is down-doped with fluorine (in an inner ring of the cladding). Tested fibers were 1.8-2 m long. Low-stress fiber mounting was employed, and fiber positions were adjusted accordingly.

Reliable sparking (100% of the time) of the output beam in atmospheric pressure air (P$_{atm}$=0.85 bar) for a straight fiber without a cell. It was confirmed that dust did not aid the breakdown process, by directing a weak nitrogen purge flow at the focal point. For consistent sparking, the minimum fiber input energy was 3.5 mJ with 3.1 mJ exiting the fiber and 2 mJ incident on the focusing lens. The fiber output could be focused to a diameter of 8 μm (demagnification of 50) giving a focal spot intensity of 420 GW/cm$^2$. The fiber output beam quality was M$^2$=2.5 ($D_m$=2.0×10$^{-6}$ rad$^2$/m at 1064 nm found from the numeric model described in Hurand et al., supra.), which can be contrasted against a 400 μm core fiber with 440 μm cladding having output M$^2$=38 ($D_m$=1.2×10$^{-4}$ rad$^2$/m)

without spark formation in atmospheric pressure air. Onset of fiber damage (inside the fiber at 2-5 cm downstream of the fiber input) occurred for input energies of 6-8 mJ, that is, at core intensities of 0.5-0.7 GW/cm² (found as averaged over the core, not at the peak). The peak powers in these experiments, ..0.8 MW, were below the threshold for self-focusing (~4 MW). Effects of Stimulated Brillouin Scattering were observed when the Nd:YAG laser was seeded, in which case the fiber transmission decreased from >80% to 30% when the power level was raised from 50 kW to 340 kW, and a retro-reflected beam was observed.

For many applications it is desirable to have elevated pulse energies, for example, ignition of lean methane (natural gas) mixtures requires ~10-20 mJ. One means to deliver the higher energies without causing fiber damage is to increase the pulse duration while keeping the peak intensity inside the fiber (and peak power) below the fiber damage threshold. Fibers were also coiled with a single (360°) loop having 25 cm radius. The change in output beam quality for this modest bend radius was found to be minimal.

Figure 6:
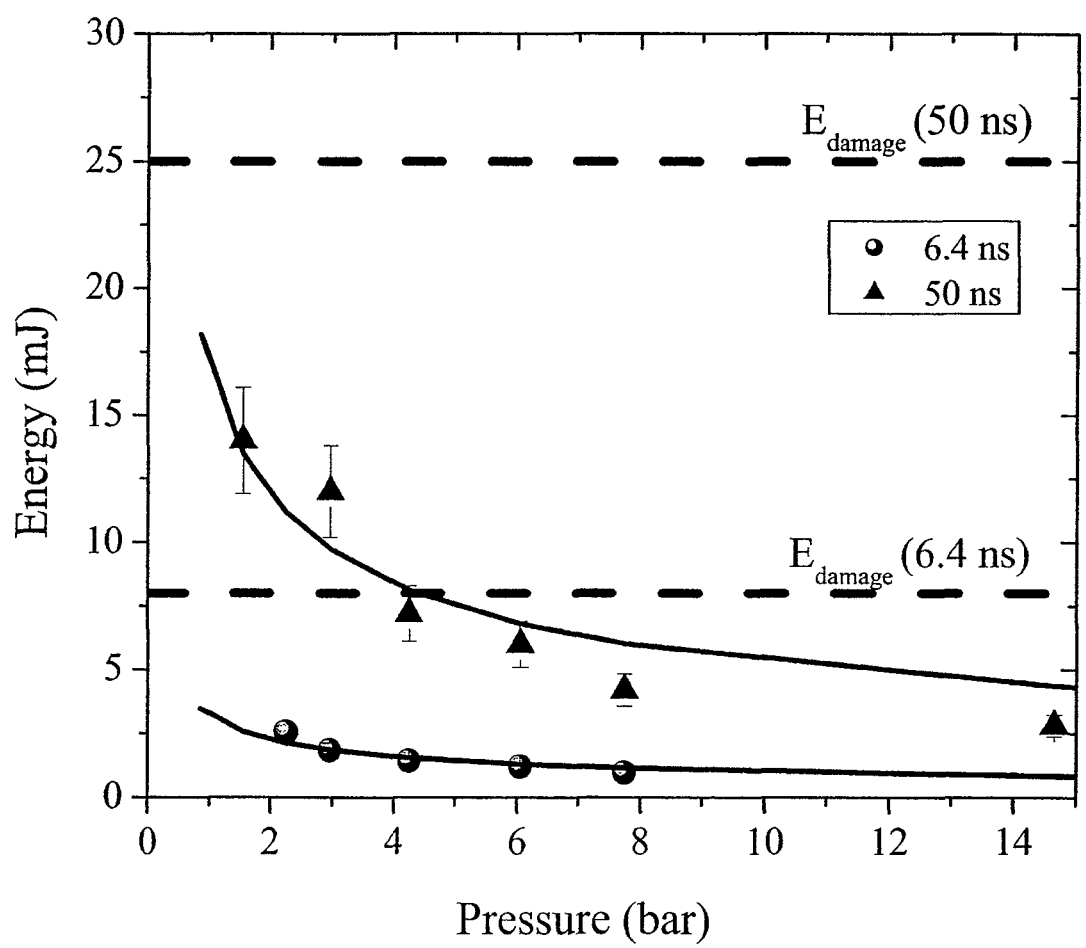
FIG. 6 shows pulse energies required for spark formation (100% reliability) versus absolute gas pressure, and measured fiber damage limits for pulse durations of 6.4 ns and 50 ns with 1064 nm wavelength beam pulses, the best fit curves having $p^{-0.5}$ dependence, where p is the gas pressure.

FIG. 6 shows pulse energies required for spark formation (100% reliability) versus gas pressure, and measured fiber damage limits for pulse durations of 6.4 ns and 50 ns. Longer pulses were achieved by delaying the Q-switch firing. The plotted uncertainties are based on standard deviation of measured energies (±10% for 50 ns pulses and ±5% for 6.4 pulses). The longer pulses allow increased energies with fiber damage occurring at 25 mJ for 50 ns pulses (average intensity of 0.6 GW/cm² in the core), and the pressure dependence of the threshold intensity (energy) scales roughly as $p^{-0.5}$. At the elevated pressures of interest for engine applications (a minimum of 3-8 bar at time of ignition), there is a significant margin between the energy required to spark and that which damages the fiber, that is, a ratio greater than 3 for pressures >5 bar, showing the potential for delivery of sparks with large cladding fibers in these applications.

2. Other Applications

The ability to use fibers for delivery of high power beams with high beam quality in accordance with embodiments of the present claimed invention, can also benefit other applications including gas-phase laser induced breakdown spectroscopy (LIBS), as well as laser drilling, welding, and cutting. In biological applications, for example using ablation by high power, tightly focused laser beams are also contemplated.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for transmission of a beam of laser pulses having a chosen energy, wavelength, λ, and duration, T, comprising:
   an optical fiber having an input end, an output end, a selected length, a core having a chosen diameter, and a cladding having a diameter >1.25·core diameter, and a beam quality, $M^2 <$ core diameter $(\mu m) \cdot 1064/(20 \cdot \lambda (nm))$;
   a first lens for receiving the beam of laser pulses and launching the beam of laser pulses into the input end of said optical fiber at a launch angle ≤0.03 rad; and
   a second lens for focusing the beam of laser pulses exiting the output end of said optical fiber.

2. The apparatus of claim 1, further comprising a third lens for collimating the beam of laser pulses exiting the output end of said optical fiber before the beam is focused by said second lens.

3. The apparatus of claim 1, wherein said second lens is integrated with the output end of said optical fiber.

4. The apparatus of claim 1, further comprising a spatial filter for improving the mode quality of the beam of laser pulses before the beam of laser pulses is directed into said optical fiber.

5. The apparatus of claim 4, further comprising a telescope for adjusting the size of the beam of laser pulses before the beam enters said first lens.

6. The apparatus of claim 1, further comprising a half waveplate and a polarizer for varying the energy of the laser pulses.

7. The apparatus of claim 1, wherein the core of said optical fiber comprises high OH concentration for use at ultraviolet wavelengths.

8. The apparatus of claim 1, wherein the chosen length of said optical fiber is less than approximately 300 m.

9. The apparatus of claim 8, wherein said optical fiber has a bending radius ≥5 cm.

10. The apparatus of claim 1, wherein the beam of laser pulses is focused to ≤15 μm by said second lens.

11. The apparatus of claim 10, wherein the beam of laser pulses has sufficient power to generate a gas spark at pressures less than 100 atm at the focus of said second lens.

12. The apparatus of claim 10, wherein the intensity of the beam of laser pulses in said core is $<5 \, (10/T \, (ns))^{0.5} \, GW/cm^2$.

13. The apparatus of claim 10, wherein the beam of laser pulses is generated using a Q-switched Nd:YAG laser.

14. The apparatus of claim 1, wherein the focused beam of laser pulses is effective for uses chosen from laser ignition, laser-induced breakdown spectroscopy, laser drilling, laser cutting, laser welding, and medical applications.

15. The apparatus of claim 1, wherein the core of said optical fiber comprises silica.

16. The apparatus of claim 1, wherein stress on said optical fiber is minimized.

17. The apparatus of claim 1, wherein said core comprises a graded index core.

18. An apparatus for generating a gas spark at pressures less than 100 atm, comprising:
   a laser for producing a beam of laser pulses having a chosen energy, wavelength, λ, and duration, T;
   an optical fiber having an input end, an output end, a selected length, a core having a chosen diameter, and a cladding having a diameter >1.25·core diameter, and a beam quality, $M^2 <$ core diameter $(\mu m) \cdot 1064/(20 \cdot \lambda (nm))$;
   a first lens for receiving the beam of laser pulses from said laser and launching the beam of laser pulses into the input end of said optical fiber at a launch angle ≤0.03 rad; and
   a second lens for focusing the collimated beam of laser pulses exiting said second lens.

19. The apparatus of claim 18, further comprising a third lens for collimating the beam of laser pulses exiting the output end of said optical fiber.

20. The apparatus of claim 18, further comprising a spatial filter for improving the mode quality of the beam of laser pulses before the beam of laser pulses is directed into said optical fiber.

21. The apparatus of claim 20, further comprising a telescope for adjusting the size of the beam of laser pulses before the beam enters said first lens.

22. The apparatus of claim 18, wherein the chosen length of said optical fiber is less than approximately 300 m.

23. The apparatus of claim 22, wherein said optical fiber has a bending radius ≥5 cm.

24. The apparatus of claim 18, wherein the beam of laser pulses is focused to ≤15 μm by said second lens.

25. The apparatus of claim 24, wherein the beam of laser pulses has sufficient energy to generate a gas spark at pressures less than 100 atm at the focus of said second lens.

26. The apparatus of claim 24 wherein the intensity of the beam of laser pulses in said core is wherein the intensity of the beam of laser pulses in said core is $<5\,(10/T\,(ns))^{0.5}\,GW/cm^2$.

27. The apparatus of claim 24, wherein the beam of laser pulses is generated using a Q-switched Nd:YAG laser.

28. The apparatus of claim 18, wherein the core of said optical fiber comprises high OH concentration for use at ultraviolet wavelengths.

29. The apparatus of claim 18, wherein the core of said optical fiber comprises silica.

30. The apparatus of claim 18, wherein stress on said optical fiber is minimized.

31. The apparatus of claim 18, wherein said core comprises a graded index core.

32. A method for transmitting a beam of laser pulses having a chosen energy, wavelength, λ, and duration, T, comprising:
  receiving the beam of laser pulses;
  focusing the beam of laser pulses into the input end of a step-index optical fiber having low mode-coupling at a launch angle ≤0.03 rad, the optical fiber having an input end, an output end, a selected length, a core having a chosen diameter, and a cladding having a diameter >1.25·core diameter, and a beam quality, $M^2$<core diameter (μm)·1064/(20·λ(nm)), and wherein the core of the optical fiber is sufficiently large that the intensity of the beam of laser pulses in the core is $<5\,(10/T\,(ns))^{0.5}\,GW/cm^2$; and
  focusing the beam of laser pulses exiting the output end of the step-index optical fiber.

33. The method of claim 32, further comprising the step of collimating the beam of laser pulses exiting the output end of the step-index optical fiber before said step of focusing the beam of laser pulses.

34. The method of claim 32, further comprising the step of adjusting the size of the beam of laser pulses before said step of focusing the beam of laser pulses into the input end of the step-index optical fiber.

35. The method of claim 32, wherein the focused beam of laser pulses is effective for uses chosen from laser ignition, laser-induced dielectric spectroscopy, laser drilling, laser cutting, laser welding, and medical applications.

36. The method of claim 32, wherein the core of the optical fiber comprises silica.

37. A method for generating a gas spark at pressures less than 100 atm, comprising:
  producing a beam of laser pulses having a chosen energy, wavelength, λ, and duration, T;
  focusing the beam of laser pulses into the input end of a step-index optical fiber having low mode-coupling at a launch angle ≤0.03 rad, the optical fiber having an input end, an output end, a selected length, a core having a chosen diameter, and a cladding having a diameter >1.25·core diameter, and a beam quality, $M^2$<core diameter (μm)·1064/(20·λ(nm)), and wherein the core of the optical fiber is sufficiently large that the intensity of the beam of laser pulses in the core is $<5\,(10/T\,(ns))^{0.5}\,GW/cm^2$; and
  focusing beam of laser pulses exiting the output end of the step-index optical fiber.

38. The method of claim 37, further comprising the step of collimating the beam of laser pulses exiting the output end of the step-index optical fiber before said step of focusing the beam of laser pulses.

39. The method of claim 37, further comprising the step of adjusting the size of the beam of laser pulses before said step of focusing the beam of laser pulses into the input end of an optical fiber.

40. The method of claim 37, wherein the core of the optical fiber comprises silica.

* * * * *